US010171576B2

(12) United States Patent
Xiao et al.

(10) Patent No.: US 10,171,576 B2
(45) Date of Patent: Jan. 1, 2019

(54) METHOD, APPARATUS, AND SYSTEM FOR INTERACTION BETWEEN TERMINALS

(71) Applicant: TENCENT TECHNOLOGY (SHENZHEN) COMPANY LIMITED, Shenzhen (CN)

(72) Inventors: Zhijie Xiao, Shenzhen (CN); Yaode Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 322 days.

(21) Appl. No.: 14/723,601

(22) Filed: May 28, 2015

(65) Prior Publication Data
US 2015/0341430 A1 Nov. 26, 2015

Related U.S. Application Data

(63) Continuation of application No. PCT/CN2013/087054, filed on Nov. 13, 2013.

(30) Foreign Application Priority Data

Dec. 3, 2012 (CN) .......................... 2012 1 0508689

(51) Int. Cl.
*G06F 15/16* (2006.01)
*H04L 29/08* (2006.01)
(Continued)

(52) U.S. Cl.
CPC ............ *H04L 67/104* (2013.01); *H04L 43/10* (2013.01); *H04L 51/00* (2013.01); *H04L 67/22* (2013.01); *H04L 67/36* (2013.01)

(58) Field of Classification Search
CPC ....... H04L 67/104; H04L 43/10; H04L 51/00; H04L 67/22; H04L 67/36
See application file for complete search history.

(56) References Cited

U.S. PATENT DOCUMENTS

2009/0265643 A1  10/2009  Jachner et al.
2010/0030578 A1*  2/2010  Siddique ............ G06Q 10/0637
                                                                    705/3
(Continued)

FOREIGN PATENT DOCUMENTS

CN    101511134 A    8/2009
CN    102655633 A    9/2012
(Continued)

OTHER PUBLICATIONS

The World Intellectual Property Organization (WIPO) International Search Report for PCT/CN2013/087054 dated Feb. 27, 2014.
(Continued)

*Primary Examiner* — Suraj M Joshi
*Assistant Examiner* — Jaren Means
(74) *Attorney, Agent, or Firm* — Anova Law Group, PLLC

(57) ABSTRACT

The present disclosure provides a method for interaction between terminals, implemented by a first terminal. The method includes: acquiring to-be-sent data; sending the to-be-sent data to a second terminal; displaying a display interface; monitoring whether first operation information from the second terminal is received, the first operation information including a processing operation received by the second terminal after the second terminal outputs the to-be-sent data and performed by a user of the second terminal on the to-be-sent data; and updating the display interface according to the first operation information once the first operation information sent by the second terminal is received. The present disclosure further provides an apparatus and a system for interaction between terminals. According to the present disclosure, data can be exchanged between terminals in real time, thereby improving interactivity between users of the terminals.

17 Claims, 9 Drawing Sheets

(51) Int. Cl.
*H04L 12/26* (2006.01)
*H04L 12/58* (2006.01)

(56) References Cited

U.S. PATENT DOCUMENTS

| | | | | |
|---|---|---|---|---|
| 2010/0299194 A1* | 11/2010 | Snyder | ............... | G06Q 20/10 |
| | | | | 705/14.13 |
| 2012/0066041 A1* | 3/2012 | Mankoff | ............ | G06Q 20/0457 |
| | | | | 705/14.17 |

FOREIGN PATENT DOCUMENTS

| | | | |
|---|---|---|---|
| CN | 102801647 A | 11/2012 | |
| WO | 2012059509 A1 | 5/2012 | |

OTHER PUBLICATIONS

The State Intellectual Property Office of the People's Republic of China (SIPO) Office Action 1 for 201210508689.X dated Jun. 13, 2016 7 pages (including translation).

* cited by examiner

METHOD, APPARATUS, AND SYSTEM FOR INTERACTION BETWEEN TERMINALS

CROSS-REFERENCES TO RELATED APPLICATIONS

This application is a continuation of PCT Application No. PCT/CN2013/087054, filed on Nov. 13, 2013, which claims priority to Chinese Patent Application No. CN201210508689X, filed on Dec. 3, 2012, the entire contents of all of which are incorporated herein by reference.

FIELD OF THE TECHNOLOGY

The present disclosure generally relates to the field of network technologies and, more particularly, relates to a method, an apparatus, and a system for interaction between terminals.

BACKGROUND OF THE DISCLOSURE

Network communication has become one of indispensable communication means of many people in today's life. With the constant development of network communication, people can exchange e-mails and chat instantly by using a network, and can also send gifts to relatives and friends by using the network. However, with the accelerated pace of modern life and work, it may be a burden for people to physically send gifts to a family member, a colleague, or a friend for holidays and occasions. In contrast, sending a virtual gift by using a network may enable people to convey their wishes more conveniently, faster, and timelier.

However, interaction between a gift sender and a gift receiver for the virtual gift is often limited and has undesirable real-time performance. After receiving the virtual gift, the gift receiver cannot feedback at the very first time to the gift sender in a fast and efficient fashion that the virtual gift has been received, and can only leave a text message to the gift sender afterwards. As more interaction manners between mobile terminals such as mobile phones occur, additional requirements are brought up for interactivity of a virtual gift. However, a current exchange manner of a virtual gift between terminals greatly reduces interactivity and playability of the virtual gift.

Therefore, there is a need to solve technical problems in the Internet and computer technology to provide methods, apparatus, and systems for interaction between terminals for data exchange such as a virtual gift exchange.

SUMMARY

The present disclosure provides methods, apparatus, and systems for interaction between terminals for data exchange between the terminals in real time, thereby improving interactivity between users of the terminals.

One aspect of the present disclosure provides a method for interaction between terminals, implemented by a first terminal, including: acquiring to-be-sent data; sending the to-be-sent data to a second terminal; displaying a display interface; monitoring whether first operation information from the second terminal is received, the first operation information including a processing operation, received by the second terminal after the second terminal outputs the to-be-sent data and performed by a user of the second terminal on the to-be-sent data; and updating the display interface according to the first operation information, once the first operation information sent by the second terminal is received.

Another aspect of the present disclosure provides an apparatus for interaction between terminals, implemented by a first terminal, including: an acquiring module, configured to acquire to-be-sent data; a sending module, configured to send the to-be-sent data to a second terminal; a display module, configured to display a display interface; a first monitoring module, configured to monitor whether first operation information from the second terminal is received, the first operation information including a processing operation, received by the second terminal after the second terminal outputs the to-be-sent data and performed by a user of the second terminal on the to-be-sent data; and an update module, configured to update the display interface according to the first operation information, once the first operation information sent by the second terminal is received.

Another aspect of the present disclosure provides a system for interaction between terminals including a first terminal and a second terminal. The first terminal is configured to acquire to-be-sent data and send the to-be-sent data to the second terminal. The second terminal is configured to receive the to-be-sent data and output the to-be-sent data. The first terminal is further configured to display a display interface. The second terminal is further configured to generate first operation information and send the first operation information to the first terminal, the first operation information including a processing operation performed by a user on the to-be-sent data. The first terminal is further configured to monitor whether the first operation information is received, and update the display interface according to the first operation information when the first operation information is received.

Another aspect of the present disclosure provides a method for interaction between terminals including the following steps: acquiring, by a first terminal, to-be-sent data and sending the to-be-sent data to a second terminal; receiving, by the second terminal, the to-be-sent data and outputting the to-be-sent data; displaying, by the first terminal, a display interface; generating, by the second terminal, first operation information and sending the first operation information to the first terminal, the first operation information including a processing operation performed by a user on the to-be-sent data; and monitoring, by the first terminal, whether the first operation information is received, and updating the display interface according to the first operation information when the first operation information is received.

According to the method, the apparatus, and the system for interaction between terminals, data can be exchanged between terminals in real time, thereby improving interactivity between users of the terminals.

Other aspects or embodiments of the present disclosure can be understood by those skilled in the art in light of the description, the claims, and the drawings of the present disclosure. To make the foregoing and other objectives, features, and advantages of the present disclosure clearer and more comprehensible, the following uses preferred embodiments for detailed descriptions with reference to the accompanying drawings.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

To further explain the technical means used in the present disclosure for achieving the intended objectives and the effects thereof, specific implementation manners, structures, features, and effects of the present disclosure are described in detail below with reference to the accompanying drawings and preferred embodiments.

First Embodiment

Figure 1:
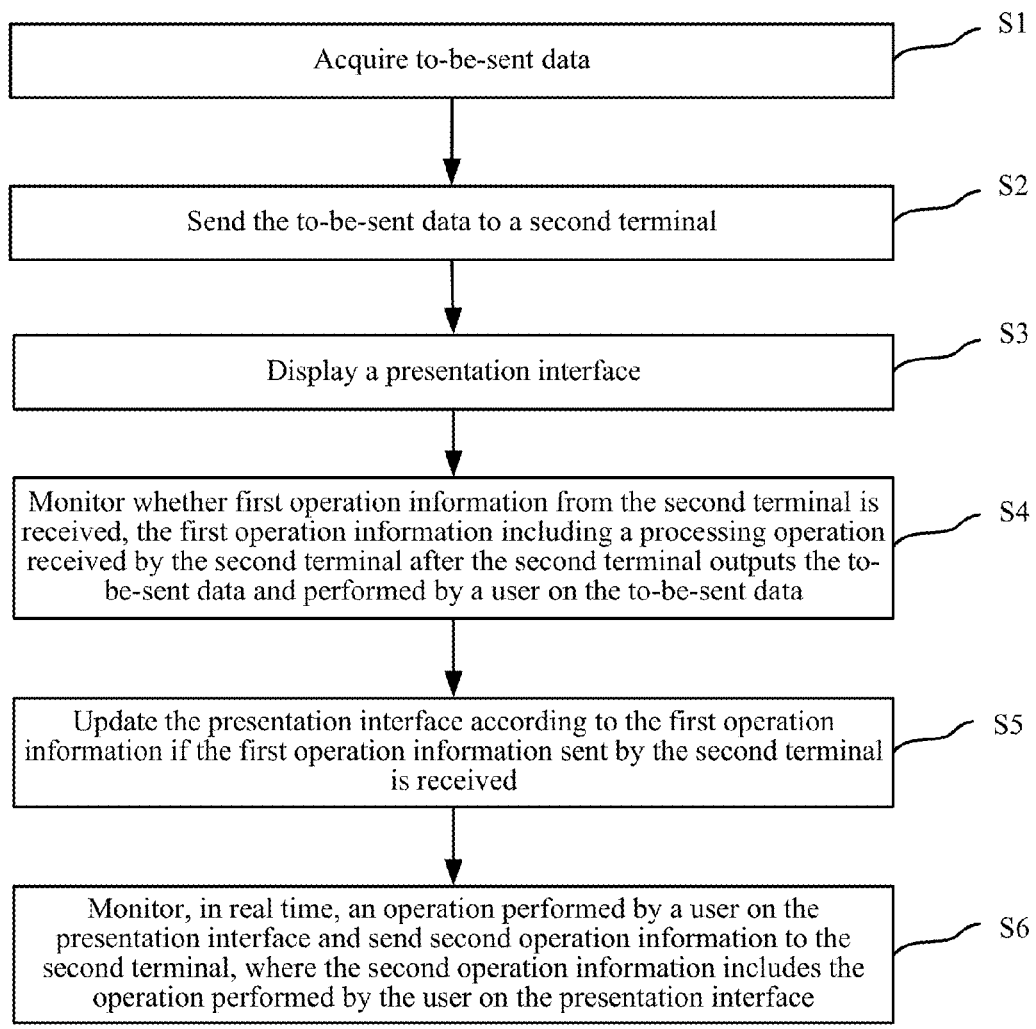
FIG. 1 is a flowchart of a method for interaction between terminals according to a first embodiment of the present invention.

Referring to FIG. 1, the first exemplary embodiment provides a method for interaction between terminals, implemented by a first terminal. The method includes the following exemplary steps.

Step S1: Acquire to-be-sent data.
Step S2: Send the to-be-sent data to a second terminal.
Step S3: Display a display interface.
Step S4: Monitor whether first operation information from the second terminal is received, the first operation information including a processing operation received by the second terminal after the second terminal outputs the to-be-sent data and performed by a user of the second terminal on the to-be-sent data.
Step S5: Update the display interface according to the first operation information, once the first operation information sent by the second terminal is received.
Step S6: Monitor, in real time, an operation performed by a user on the display interface of the first terminal and send second operation information to the second terminal. The second operation information includes the operation performed by the user on the display interface of the first terminal.

The following provides further detailed description with reference to specific examples.

The to-be-sent data in step S1 may be acquired by the first terminal from a server or another terminal by using a network, and may also be acquired from a storage device of the first terminal. For example, the to-be-sent data is a text edited by the user and stored in the storage device of the first terminal, a picture and/or video selected from a website, or a combination thereof.

After receiving the to-be-sent data, the second terminal in step S2 may output the to-be-sent data for the user of the second terminal to view. The user may perform the processing operation on the output to-be-sent data, for example, if the to-be-sent data is a text, the user may edit the text; and if the to-be-sent data is a picture, the user may evaluate and revise the picture.

The second terminal receives the processing operation performed by the user on the output to-be-sent data and generates first operation information. The first operation information includes the processing operation received by the second terminal and performed by the user on the output to-be-sent data.

The display interface in step S3 may be used for presenting the to-be-sent data, for example, presenting the acquired text or picture for the user to view. The display interface may also be used for presenting other information, for example, presenting a waiting interface, and waiting for information sent by the second terminal.

In step S4, it is constantly monitored whether the first operation information from the second terminal is received, and step S5 is performed once the first operation information is received, that is, the display interface is updated according to the first operation information, so as to synchronously process, when the to-be-sent data output by the second terminal is processed, the to-be-sent data presented on the display interface of the first terminal.

For example, if the to-be-sent data is a text, the first operation information represents a revision made by the user of the second terminal to the text, and the text presented on the display interface is also revised correspondingly and synchronously.

In step S6, after receiving the second operation information, the second terminal may also update the output to-be-sent data according to the second operation information, so as to synchronously process, when the to-be-sent data presented on the display interface is processed, the to-be-sent data is output by the second terminal.

In conclusion, according to the method for interaction between terminals in this embodiment, data can be exchanged between terminals in real time, and data can be synchronously updated between the terminals, thereby enhancing interactivity between the terminals.

Figure 2:
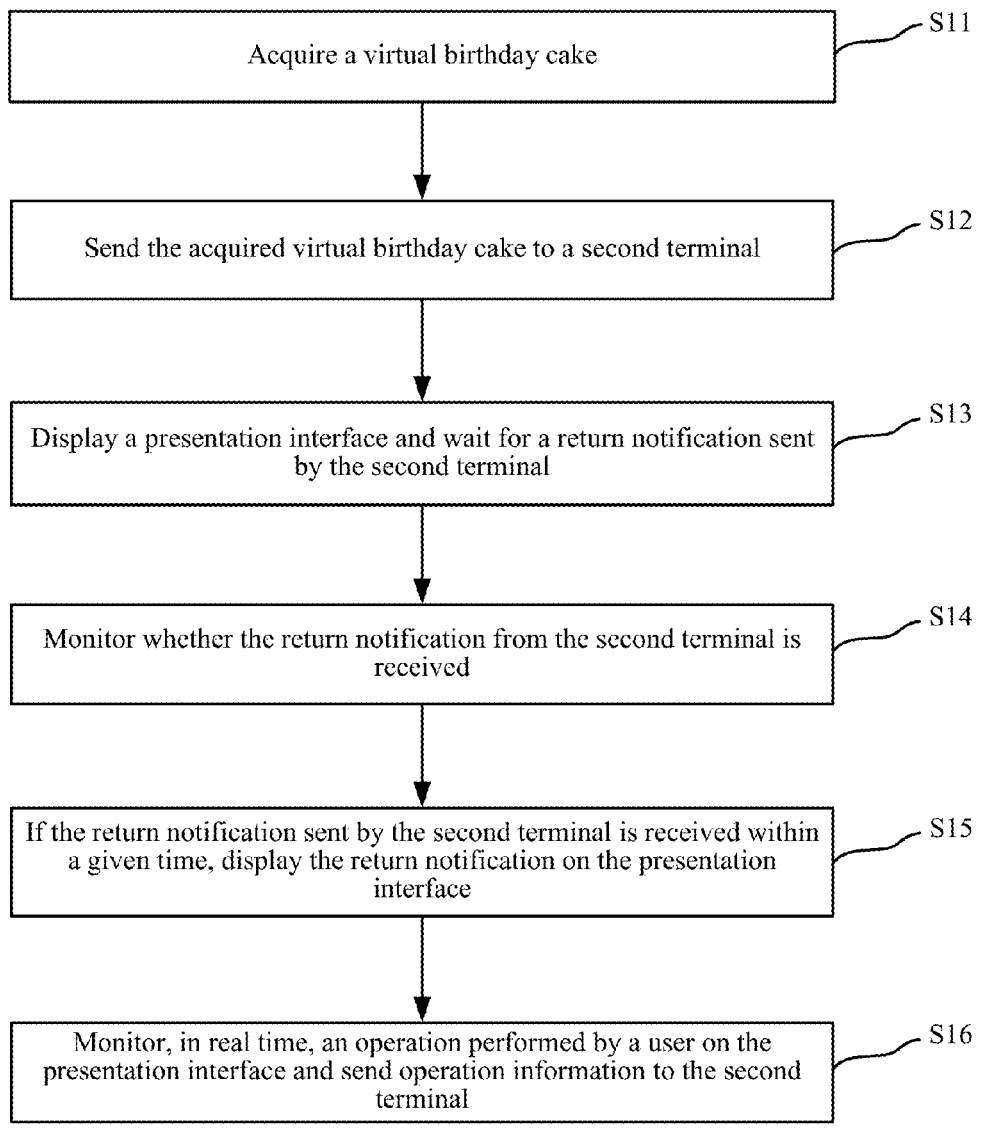
FIG. 2 is a flowchart of a method for interaction between terminals for sending a virtual birthday cake according to various disclosed embodiments of the present disclosure.

FIG. 2 illustrates a flowchart of a method for interaction between terminals, e.g., for sending a virtual birthday cake according to various embodiments. The method is implemented by a first terminal.

Step S11: Acquire a virtual gift, for example, a virtual birthday cake.

The virtual gift may be a virtual object set by a social networking site as needed. A virtual birthday cake is used as an example herein. The virtual gift, for example, further includes virtual flowers, a virtual music box, and a virtual dress and adornment. The virtual birthday cake may be acquired from a page of a virtual gift set. The page of the virtual gift set may be generated according to virtual gift data, for example, the page of the virtual gift set may be presented in a form of a virtual gift store. The virtual gift data is pre-stored in a server or a storage device of the first terminal, and the virtual gift data needs to be acquired from the server by using a network or the virtual gift data is read from the storage device of the first terminal. In addition, according to an operation of a user, the virtual birthday cake may further include some attached files such as a message, a birthday card, background music, and/or a video.

Step S12: Send the acquired virtual birthday cake to a second terminal.

If the virtual birthday cake includes the foregoing attached files, the attached files are also sent to the second terminal, so that the virtual birthday cake is sent to a user of the second terminal to express birthday wishes.

Figure 3:
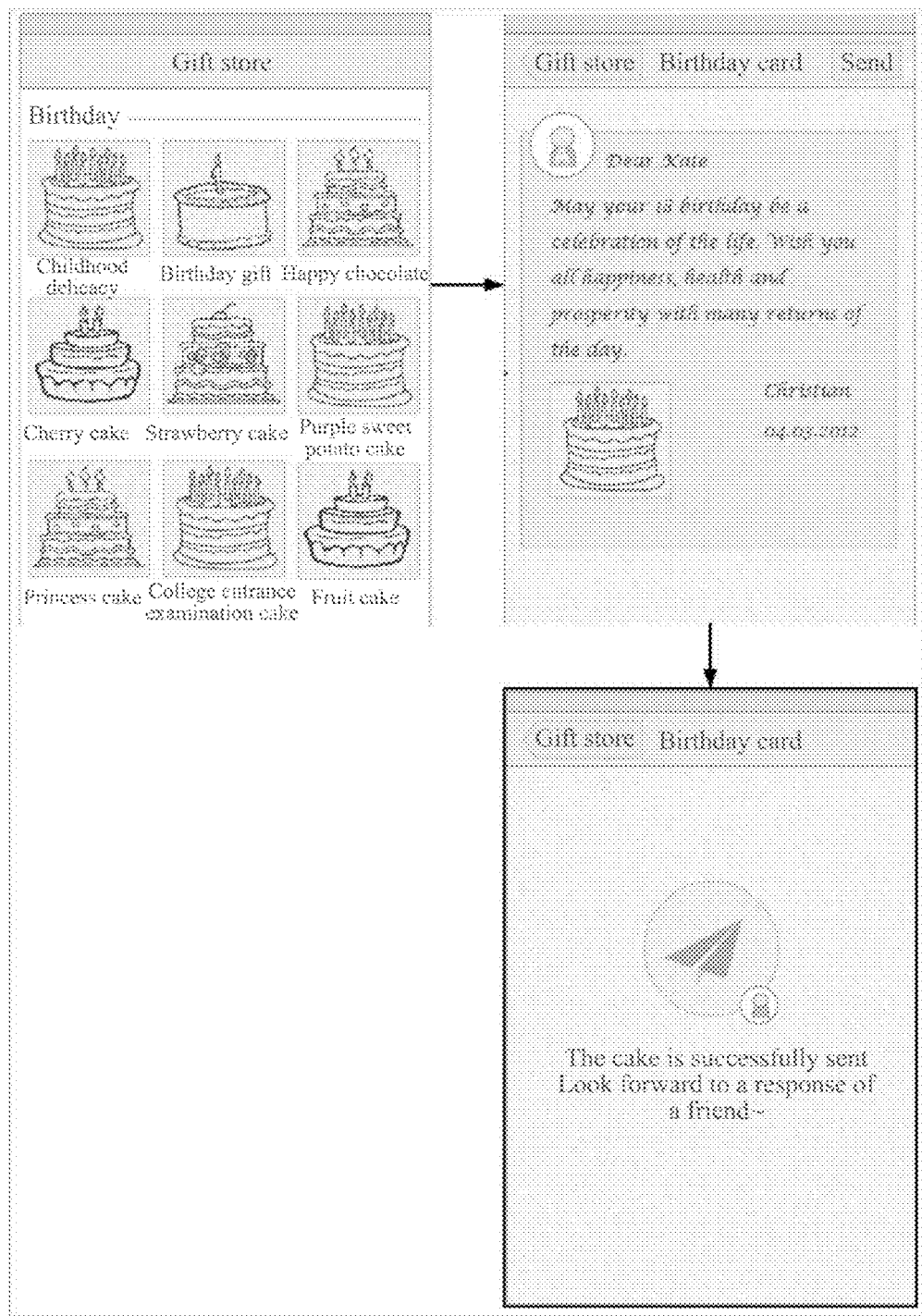
FIG. 3 is a schematic diagram of an interface for sending a virtual birthday cake according to various disclosed embodiments of the present disclosure.

Step S13: Display a display interface. The display interface may be used for presenting a waiting interface and waiting for a return notification sent by the second terminal (referring to FIG. 3). The return notification includes a processing operation received by the second terminal after the second terminal outputs the virtual birthday cake and performed by the user on the virtual birthday cake.

Step S14: Monitor whether the return notification from the second terminal is received. The return notification, for example, is acknowledgement information, which is returned by the second terminal, indicating that the virtual birthday cake has been opened by the user of the second terminal. Specifically, the acknowledgement information may be a character, a number, and/or another code. For example, the acknowledgement information may be sent automatically by a corresponding application program (for example, a host application program of a function of the virtual birthday cake) or may be sent by an active operation performed by the user of the second terminal when the user of the second terminal opens the virtual birthday cake by clicking on the virtual birthday cake.

In addition, the return notification may further include other attached information, for example, a thank-you voice or text message returned by the user of the second terminal. Further, the return notification may further include interaction information about the virtual birthday cake, for example, information indicating that a lit-up candle on the virtual birthday cake is blown out by the user of the second terminal.

In an embodiment, both the first terminal and the second terminal are provided with a sound sensor. The sound sensor uses an electric microphone that responds to a sound frequency as the human ear does. The sound sensor can sense a sound frequency in an environment and convert the sound frequency into an electrical signal. The first terminal or the second terminal sends the electrical signal to a server, and the server extinguishes the candle on the virtual birthday cake according to the electrical signal.

Generally, because an air-blown sound of people is composed of low-frequency sounds, a low frequency filter is needed to filter out a high-frequency sound. The server may check an electrical level of an electrical signal obtained after filtration in a given time (for example, every thirty seconds) and when the electrical level of the electrical signal suddenly increases, it may be considered that someone makes an action of blowing out the candle on the virtual birthday cake. The number of extinguished candles depends on the electrical signal, so as to achieve a realistic effect of blowing out the candle. If the electrical signal indicates a greater sound frequency, more candles or even all candles can be blown out; if the electrical signal indicates a smaller sound frequency, only some of the candles can be blown out or it is needed to blow out all the candles for one more time or for multiple times.

Step S15: If the return notification sent by the second terminal is received within a given time, display the return notification on the display interface; or if the return notification sent by the second terminal is not received within a given time, close the display interface automatically.

Step S16: Monitor, in real time, an operation performed by a user on the display interface and send operation information to the second terminal. The operation information includes the operation performed by the user on the display interface. For example, if the return notification displayed on the display interface includes information indicating that the lit-up candle on the virtual birthday cake is blown out by the user of the second terminal, a user of the first terminal may blow out a lit-up candle on the virtual birthday cake displayed on the display interface at the same time, and therefore the operation information includes information indicating that the user blows out the lit-up candle on the virtual birthday cake on the display interface. The operation information is sent to the second terminal and the second terminal may update the output virtual birthday cake according to the operation information, so as to synchronously update the virtual birthday cake on the first terminal and the second terminal, thereby enhancing interactivity and playability of the virtual birthday cake.

Figure 4:
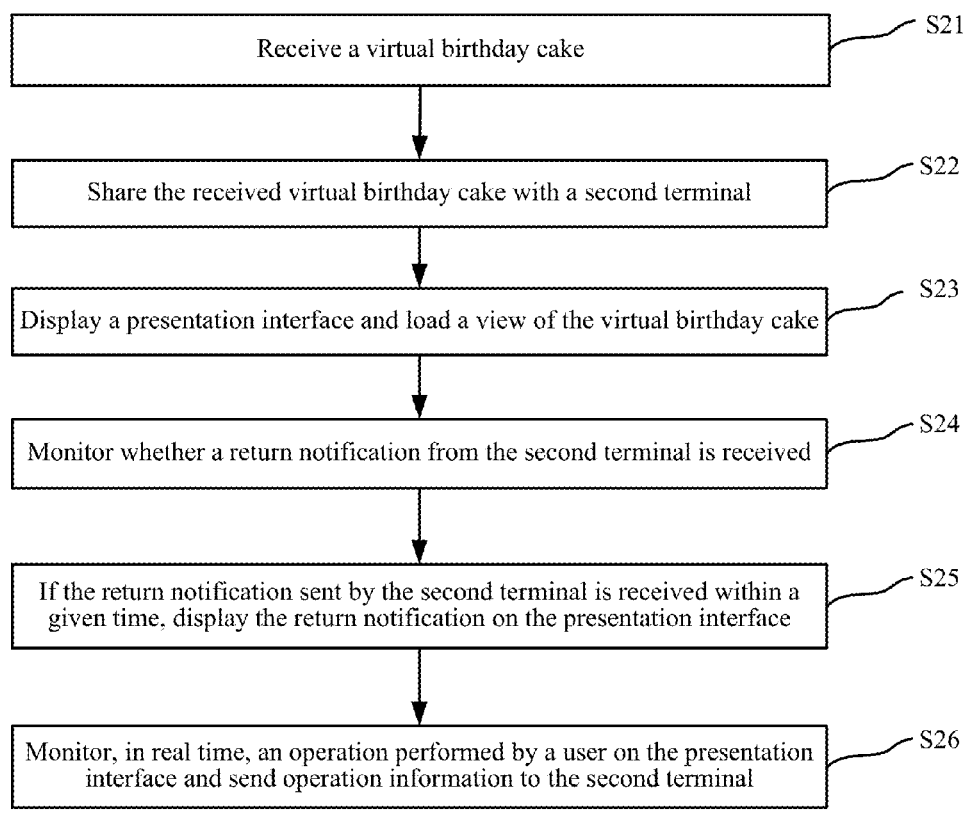
FIG. 4 is a flowchart of a method for interaction between terminals for receiving a virtual birthday cake according to various disclosed embodiments of the present disclosure.

FIG. 4 illustrates a flowchart of a method for interaction between terminals for receiving a virtual birthday cake, for example. The method is implemented by a first terminal.

Step S21: Receive a virtual birthday cake.

The virtual birthday cake may be sent by a second terminal or another terminal. The virtual birthday cake may further include attached files such as a message, a birthday card, background music, and/or a video.

Step S22: Share the received virtual birthday cake with a second terminal.

Figure 5:
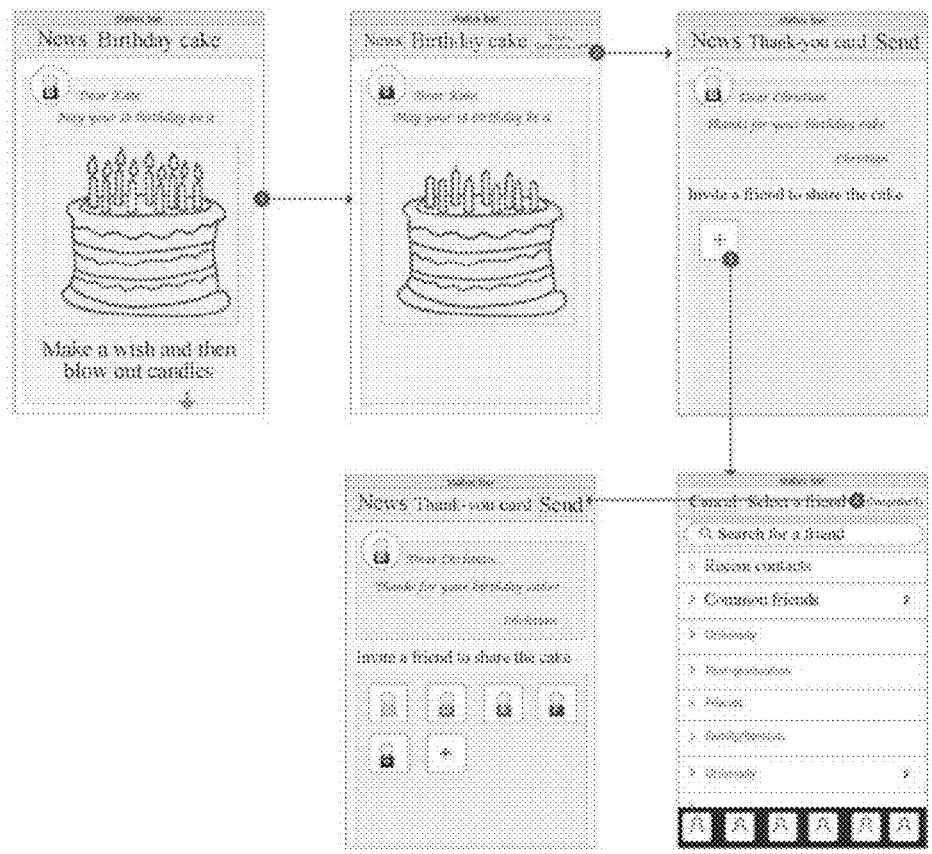
FIG. 5 is a schematic diagram of an interface for receiving a virtual birthday cake according to various disclosed embodiments of the present disclosure.

A user of the second terminal may be a sender of the virtual birthday cake, or may only be a contact of a user of the first terminal. The first terminal may send a request for sharing the virtual birthday cake to the second terminal first. The request for sharing the virtual birthday cake includes, for example, sending of a share invitation card to the second terminal, used for inviting the user of the second terminal to share the virtual birthday cake. After receiving a confirmation request sent by the second terminal, the first terminal then sends the virtual birthday cake to the second terminal (referring to FIG. 5).

Step S23: Display a display interface. The display interface may be used for presenting a view of the shared virtual birthday cake and greetings on a birthday card, and playing background music attached to the virtual birthday cake. The display interface may be further used for presenting a waiting interface and waiting for a return notification sent by the second terminal. The return notification includes a processing operation received by the second terminal after the second terminal outputs the shared virtual birthday cake and performed by the user on the virtual birthday cake.

Step S24: Monitor whether a return notification from the second terminal is received. The return notification includes, for example, birthday wishes returned by the user of the second terminal. Further, the return notification may further include interaction information about the virtual birthday cake, for example, information indicating that the virtual birthday cake is virtually bitten by the user of the second terminal.

Step S25: If the return notification sent by the second terminal is received within a given time, display the return notification on the display interface; or if the return notification sent by the second terminal is not received within a given time, close the display interface automatically.

Step S26: Monitor, in real time, an operation performed by a user on the display interface of the first terminal and send operation information to the second terminal. The operation information includes the operation performed by the user on the display interface. For example, if the return notification displayed on the display interface includes information indicating that the virtual birthday cake is bitten, the user of the first terminal may also virtually bite the virtual birthday cake displayed on the display interface, and therefore, the operation information includes information indicating that the user bites the virtual birthday cake on the display interface. The operation information is sent to the second terminal and the second terminal may update the output virtual birthday cake according to the operation information, so as to synchronously update the virtual birthday cake on the first terminal and the second terminal, thereby enhancing interactivity and playability of the virtual birthday cake.

Second Embodiment

Figure 6:
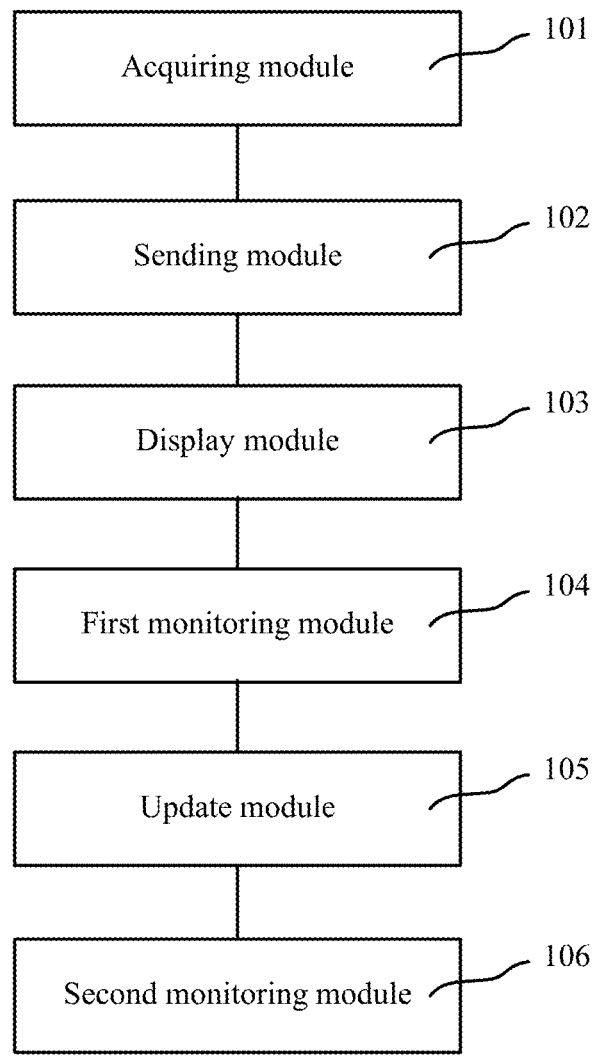
FIG. 6 is a block diagram of an apparatus for interaction between terminals according to a second embodiment of the present invention.

Referring to FIG. 6, the second exemplary embodiment provides an apparatus 100 for interaction between terminals. The apparatus 100 for interaction between terminals includes an acquiring module 101, a sending module 102, a display module 103, a first monitoring module 104, an update module 105, and a second monitoring module 106. It may be understood that, each of the foregoing modules refers to a computer program or program segment, which is used for performing one or more specific functions. In addition, differentiation of the foregoing modules does not mean that actual program code is separate.

The acquiring module 101 is configured to acquire to-be-sent data.

The sending module 102 is configured to send the to-be-sent data to a second terminal.

The display module 103 is configured to display a display interface.

The first monitoring module 104 is configured to monitor whether first operation information from the second terminal is received, the first operation information including a processing operation, received by the second terminal after the second terminal outputs the to-be-sent data and performed by a user of the second terminal on the to-be-sent data.

The update module 105 is configured to update the display interface according to the first operation information, once the first operation information sent by the second terminal is received.

The second monitoring module 106 is configured to monitor, in real time, an operation performed by a user on the display interface and send second operation information to the second terminal. The second operation information includes the operation performed by the user on the display interface.

For a specific operation process of each of the above modules, reference may be further made to the method for interaction between terminals that is provided by the first exemplary embodiment of the present invention.

Third Embodiment

Figure 7:
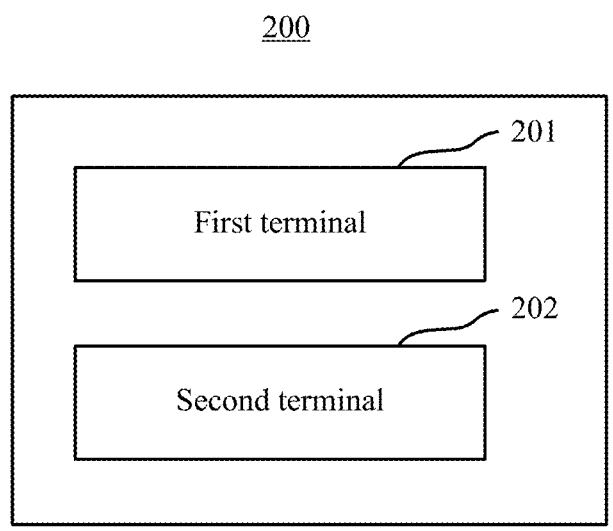
FIG. 7 is a block diagram of a system for interaction between terminals according to a third embodiment of the present invention.

Referring to FIG. 7, the third exemplary embodiment provides a system 200 for interaction between terminals. The system 200 for interaction between terminals includes a first terminal 201 and a second terminal 202.

The first terminal 201 is configured to acquire to-be-sent data and send the to-be-sent data to the second terminal.

The second terminal 202 is configured to receive the to-be-sent data and output the to-be-sent data.

The first terminal 201 is further configured to display a display interface.

The second terminal 202 is further configured to generate first operation information and send the first operation information to the first terminal, the first operation information including a processing operation performed by a user on the to-be-sent data.

The first terminal 201 is further configured to monitor whether the first operation information is received, and update the display interface according to the first operation information when the first operation information is received.

The first terminal 201 is further configured to monitor, in real time, an operation performed by a user on the display interface and send second operation information to the second terminal. The second operation information includes the operation performed by the user on the display interface.

The second terminal 202 is further configured to receive the second operation information and update the output to-be-sent data according to the second operation information.

For specific operation processes of the first terminal and the second terminal, reference may be further made to the method for interaction between terminals that is provided by the first exemplary embodiment of the present invention.

Fourth Embodiment

Figure 8:
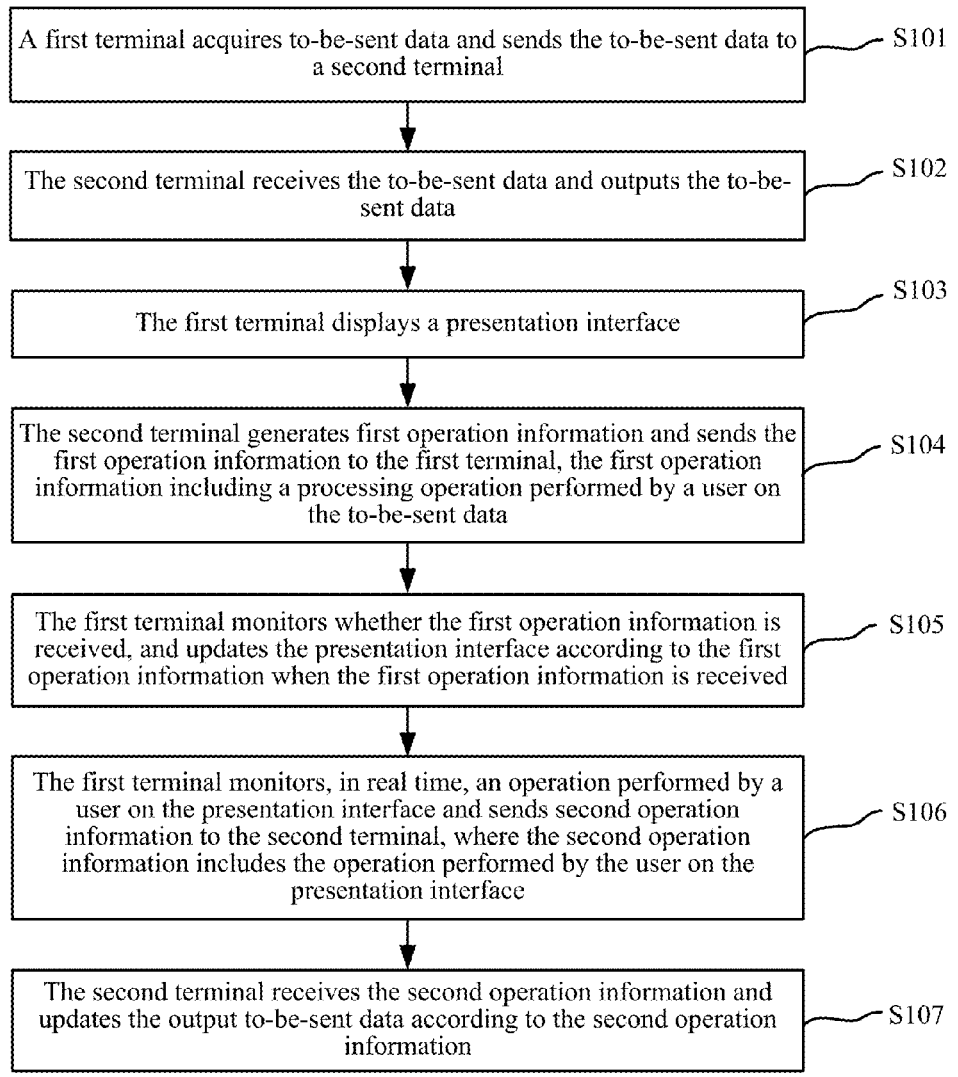
FIG. 8 is a flowchart of a method for interaction between terminals according to a fourth embodiment of the present invention.

Referring to FIG. 8, the fourth exemplary embodiment provides a method for interaction between terminals. The method includes the following exemplary steps.

Step S101: A first terminal acquires to-be-sent data and sends the to-be-sent data to a second terminal.

Step S102: The second terminal receives the to-be-sent data and outputs the to-be-sent data.

Step S103: The first terminal displays a display interface.

Step S104: The second terminal generates first operation information and sends the first operation information to the first terminal, the first operation information including a processing operation performed by a user on the to-be-sent data.

Step S105: The first terminal monitors whether the first operation information is received, and updates the display interface according to the first operation information when the first operation information is received.

Step S106: The first terminal monitors, in real time, an operation performed by a user on the display interface and sends second operation information to the second terminal. The second operation information includes the operation performed by the user on the display interface.

Step S107: The second terminal receives the second operation information and updates the output to-be-sent data according to the second operation information.

In addition, an embodiment of the present invention further provides a non-transitory computer readable storage medium, in which a computer executable instruction is stored. The foregoing computer readable storage medium, for example, is a non-volatile memory such as an optical disc, a hard disk, or a flash memory. The foregoing computer executable instruction is used for enabling a computer or a similar computing apparatus to perform various operations in the foregoing methods such as a virtual gift exchange method.

Figure 9:
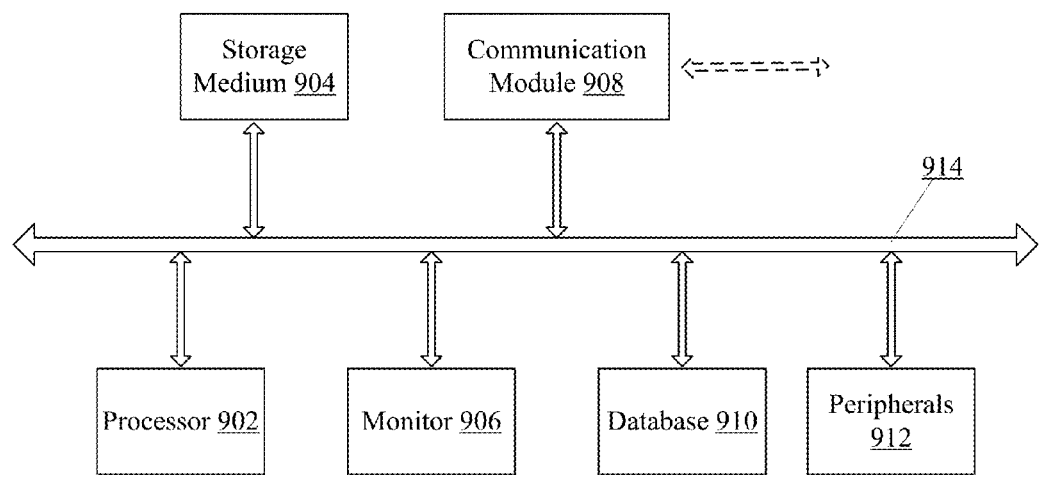
FIG. 9 is a block diagram of an exemplary computing device capable of implementing various methods according to the disclosed embodiments.

For example, FIG. 9 illustrates an exemplary computing device capable of implementing the disclosed methods, consistent with the disclosed embodiments. The computing device may include the first terminal and/or the second terminal as disclosed herein. As shown in FIG. 9, the exemplary computing device 900 may include a processor 902, a storage medium 904, a monitor 906, a communication module 908, a database 910, peripherals 912, and one or more bus 914 to couple the devices together. Certain devices may be omitted and other devices may be included.

Processor 902 may include any appropriate processor or processors. Further, processor 902 may include multiple cores for multi-thread or parallel processing. The processor 902 may be used to run computer program(s) stored in the storage medium 904. Storage medium 904 may include memory modules, such as ROM, RAM, and flash memory modules, and mass storages, such as CD-ROM, U-disk, removable hard disk, etc. Storage medium 904 may store computer programs for implementing various disclosed processes, when executed by processor 902. In one embodiment, storage medium 904 may be a non-transient computer-readable storage medium having a computer program stored thereon, when being executed, to cause the computer to implement the disclosed methods.

Further, peripherals 912 may include I/O devices such as keyboard and mouse, and communication module 908 may include network devices for establishing connections, e.g., through a communication network such as the Internet. Database 910 may include one or more databases for storing certain data and for performing certain operations on the stored data, such as webpage browsing, database searching, etc.

The foregoing descriptions are merely preferred embodiments of the present invention, but are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for interaction between terminals, comprising:
    acquiring, by a first terminal, to-be-sent data;
    sending, by the first terminal, the to-be-sent data to a second terminal;
    displaying, by the first terminal, a display interface;
    monitoring whether first operation information from the second terminal is received, the first operation information comprising a processing operation performed by a first user of the second terminal on the to-be-sent data;
    updating, by the first terminal, the display interface according to the first operation information, once the first operation information sent by the second terminal is received; and
    monitoring, in real time, an operation performed by a second user on the display interface of the first terminal and sending second operation information to the second terminal, wherein the second operation information comprises the operation performed by the second user on the display interface of the first terminal,
    wherein:
        each of the first terminal and the second terminal comprises a sound sensor for sensing a sound frequency and converting the sound frequency into an electrical signal,
        the first operation information and the second operation information are respectively obtained by the sound sensors in the second terminal and the first terminal,
        the display interface of the first terminal is updated according to an electrical level of the electrical signal contained in the first operation information from the second terminal,
        a low frequency filter is applied to the electrical signal in the first operation information to obtain a filtered signal, the first operation information being sent to the first terminal based on the filtered signal, and
        updating the display interface according to the first operation information comprises:
            when the electrical level of the electrical signal indicates a first sound frequency, updating a first number of virtual objects on the display interface; and
            when the electrical level of the electrical signal indicates a second sound frequency, updating a second number of virtual objects on the display interface.

2. The method for interaction between terminals according to claim 1, wherein the method further comprises:
    constantly monitoring whether the first operation information from the second terminal is received.

3. The method for interaction between terminals according to claim 1, wherein the first operation information and the second operation information are generated to include interaction information about a virtual gift.

4. The method for interaction between terminals according to claim 1, further comprising:
    applying a low frequency filter to the electrical signal in the first operation information to obtain a filtered signal;
    determining that an electrical level of the filtered signal has a sudden increase in a given time; and
    in response to determine determining that the electrical level of the filtered signal has the sudden increase, sending the first operation information to the first terminal.

5. The method for interaction between terminals according to claim 1, wherein:
    the first sound frequency is greater than the second sound frequency; and
    the first number is greater than the second number.

6. An apparatus for interaction between terminals, comprising:
    a memory; and
    a processor coupled to the memory, the processor being configured to:
    acquire to-be-sent data;
    send the to-be-sent data to a second terminal;
    display a display interface;
    monitor whether first operation information from the second terminal is received, the first operation information comprising a processing operation performed by a first user of the second terminal on the to-be-sent data;
    update the display interface according to the first operation information, once the first operation information sent by the second terminal is received; and
    monitor, in real time, an operation performed by a second user on the display interface of the apparatus and send second operation information to the second terminal, wherein the second operation information comprises the operation performed by the second user on the display interface of the apparatus, wherein:

each of the apparatus and the second terminal comprises a sound sensor for sensing a sound frequency and converting the sound frequency into an electrical signal, the first operation information and the second operation information are respectively obtained by the sound sensors in the second terminal and the apparatus, the display interface of the apparatus is updated according to an electrical level of the electrical signal contained in the first operation information from the second terminal, a low frequency filter is applied to the electrical signal in the first operation information to obtain a filtered signal, the first operation information being sent to the first terminal based on the filtered signal, and updating the display interface according to the first operation information comprises:

when the electrical level of the electrical signal indicates a first sound frequency, updating a first number of virtual objects on the display interface; and when the electrical level of the electrical signal indicates a second sound frequency, updating a second number of virtual objects on the display interface.

7. The apparatus for interaction between terminals according to claim 6, wherein the processor first monitoring modulo is further configured to constantly monitor whether the first operation information from the second terminal is received.

8. The apparatus for interaction between terminals according to claim 6, wherein the first operation information and the second operation information are interaction information about a virtual gift.

9. The apparatus for interaction between terminals according to claim 6, wherein:

the first sound frequency is greater than the second sound frequency; and the first number is greater than the second number.

10. A system for interaction between terminals, comprising:

a first terminal and a second terminal;

the first terminal being configured to acquire to-be-sent data and send the to-be-sent data to the second terminal;

the second terminal being configured to receive the to-be-sent data;

the first terminal being further configured to display a display interface;

the second terminal being further configured to generate first operation information and send the first operation information to the first terminal, the first operation information comprising a processing operation performed by a first user of the second terminal on the to-be-sent data; and the first terminal being further configured to monitor whether the first operation information is received, and update the display interface according to the first operation information when the first operation information is received;

wherein the first terminal is further configured to: monitor, in real time, an operation performed by a second user on the display interface and send second operation information to the second terminal, wherein the second operation information comprises the operation performed by the second user on the display interface; and the second terminal is further configured to receive the second operation information and update an output to the to-be-sent data according to the second operation information, wherein:

each of the first terminal and the second terminal comprises a sound sensor for sensing a sound frequency and converting the sound frequency into an electrical signal, the first operation information and the second operation information are respectively obtained by the sound sensors in the second terminal and the first terminal, and the display interface of the first terminal is updated according to an electrical level of the electrical signal contained in the first operation information from the second terminal, a low frequency filter is applied to the electrical signal in the first operation information to obtain a filtered signal, the first operation information being sent to the first terminal based on the filtered signal, and updating the display interface according to the first operation information comprises:

when the electrical level of the electrical signal indicates a first sound frequency, updating a first number of virtual objects on the display interface; and when the electrical level of the electrical signal indicates a second sound frequency, updating a second number of virtual objects on the display interface.

11. The system for interaction between terminals according to claim 10, wherein the first terminal constantly monitors whether the first operation information is received.

12. The system for interaction between terminals according to claim 10, wherein the first operation information and the second operation information are interaction information about a virtual gift.

13. The system for interaction between terminals according to claim 10, wherein:

the first sound frequency is greater than the second sound frequency; and the first number is greater than the second number.

14. A method for interaction between terminals, comprising:

acquiring, by a first terminal, to-be-sent data and sending the to-be-sent data to a second terminal;

receiving, by the second terminal, the to-be-sent data;

displaying, by the first terminal, a display interface;

generating, by the second terminal, first operation information and sending the first operation information to the first terminal, the first operation information comprising a processing operation performed by a first user on the to-be-sent data;

monitoring, by the first terminal, whether the first operation information is received, and updating the display interface according to the first operation information when the first operation information is received;

monitoring, by the first terminal in real time, an operation performed by a second user on the display interface and sending second operation information to the second terminal, wherein the second operation information comprises the operation performed by the second user on the display interface; and receiving, by the second terminal, the second operation information and updating an output to the to-be-sent data according to the second operation information, wherein:

each of the first terminal and the second terminal comprises a sound sensor for sensing a sound frequency and converting the sound frequency into an electrical signal, the first operation information and the second operation information are respectively obtained by the sound sensors in the second terminal and the first terminal, and the display interface of the first terminal is updated according to an electrical level of the electrical signal contained in the first operation information from the second terminal;

a low frequency filter is applied to the electrical signal in the first operation information to obtain a filtered signal, the first operation information being sent to the first terminal based on the filtered signal, and updating the display interface according to the first operation information comprises:

when the electrical level of the electrical signal indicates a first sound frequency, updating a first number of virtual objects on the display interface; and when the electrical level of the electrical signal indicates a second sound frequency, updating a second number of virtual objects on the display interface.

15. The method for interaction between terminals according to claim 14, wherein the first terminal constantly monitors whether the first operation information is received.

16. The method for interaction between terminals according to claim 14, wherein the first operation information and the second operation information are generated to include interaction information on the virtual gift.

17. The method for interaction between terminals according to claim 14, wherein:

the first sound frequency is greater than the second sound frequency; and the first number is greater than the second number.

* * * * *